No. 799,943. PATENTED SEPT. 19, 1905.
J. R. ROGERS.
LINOTYPE MACHINE.
APPLICATION FILED JAN. 28, 1905.
6 SHEETS—SHEET 1.
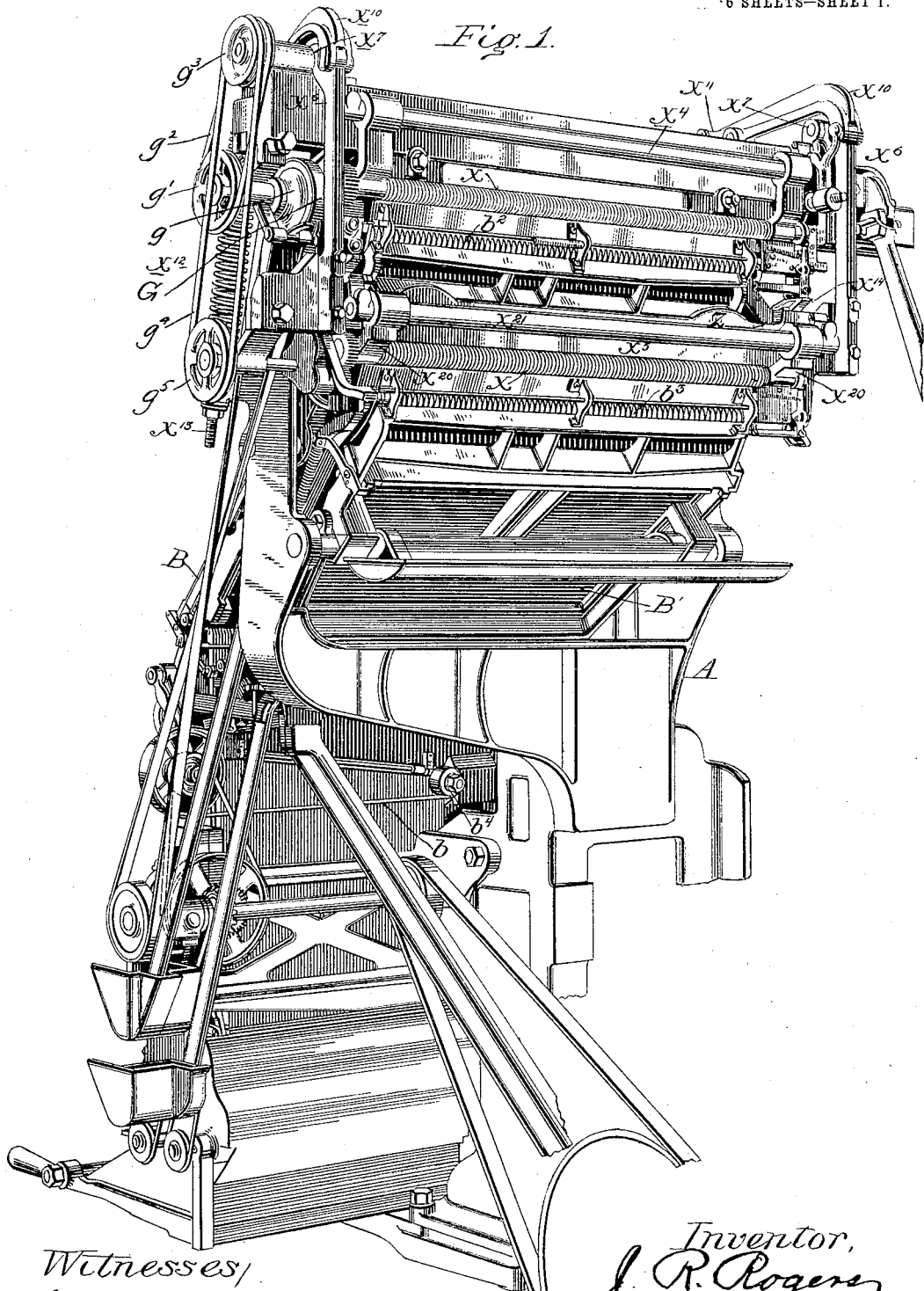

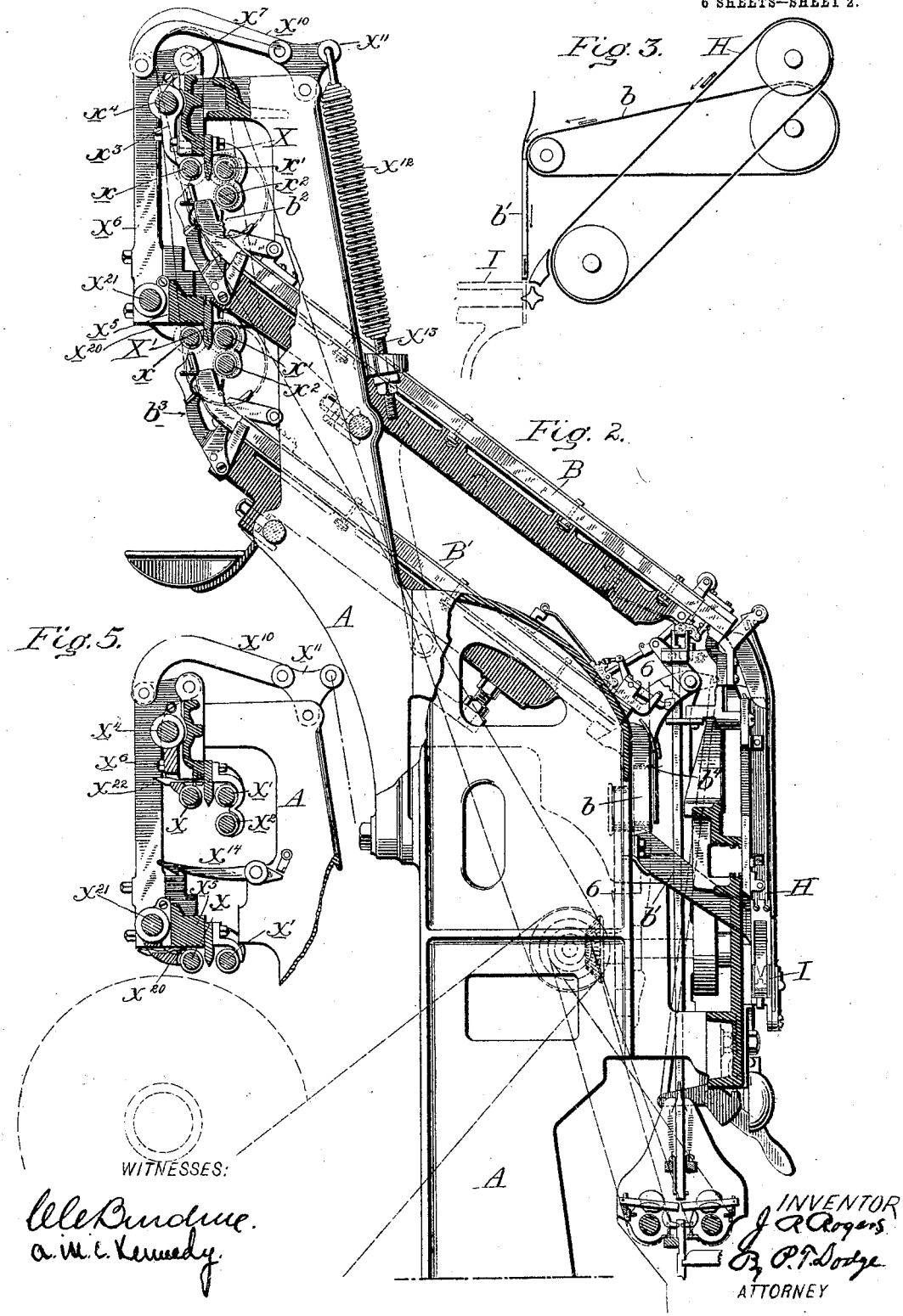

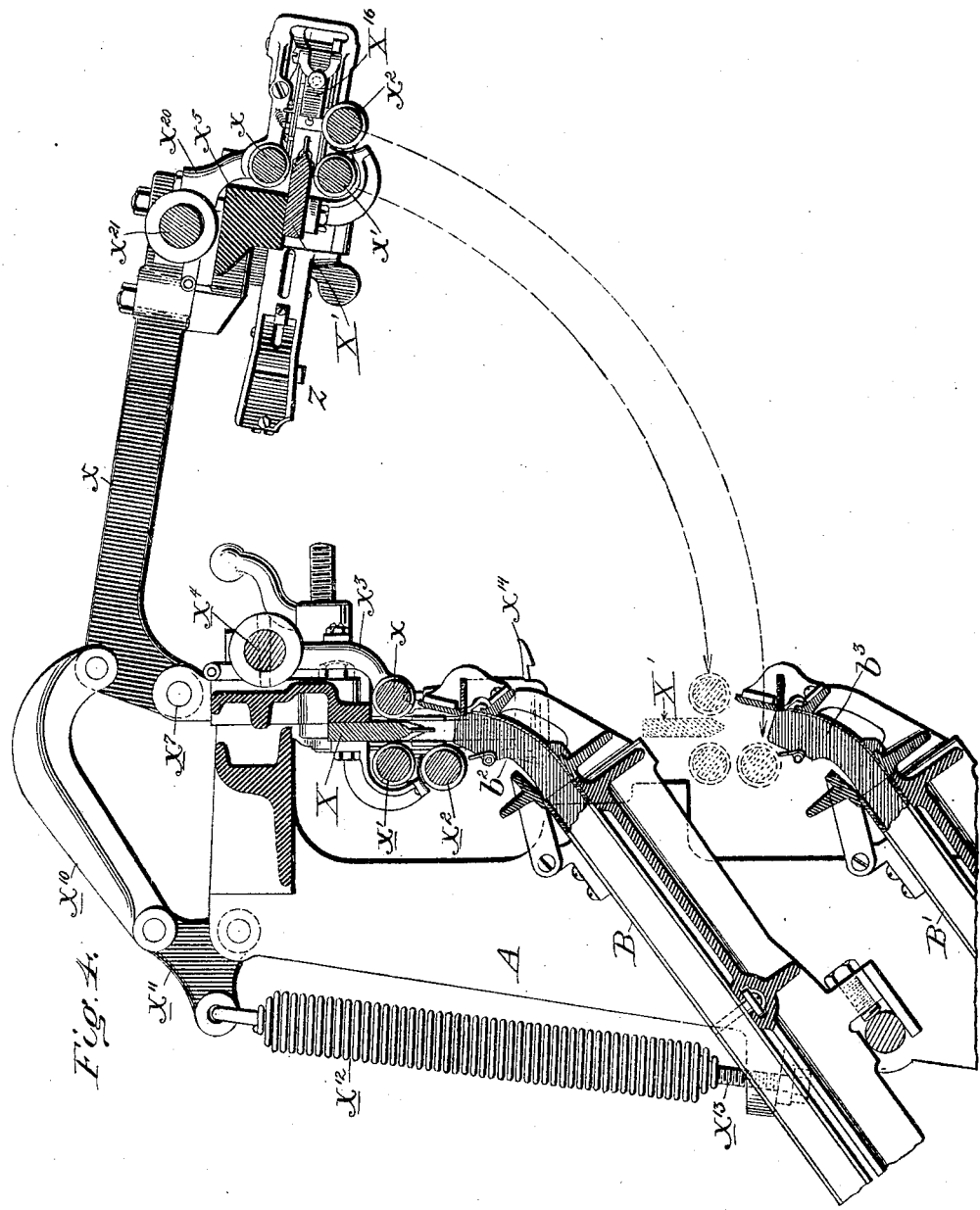

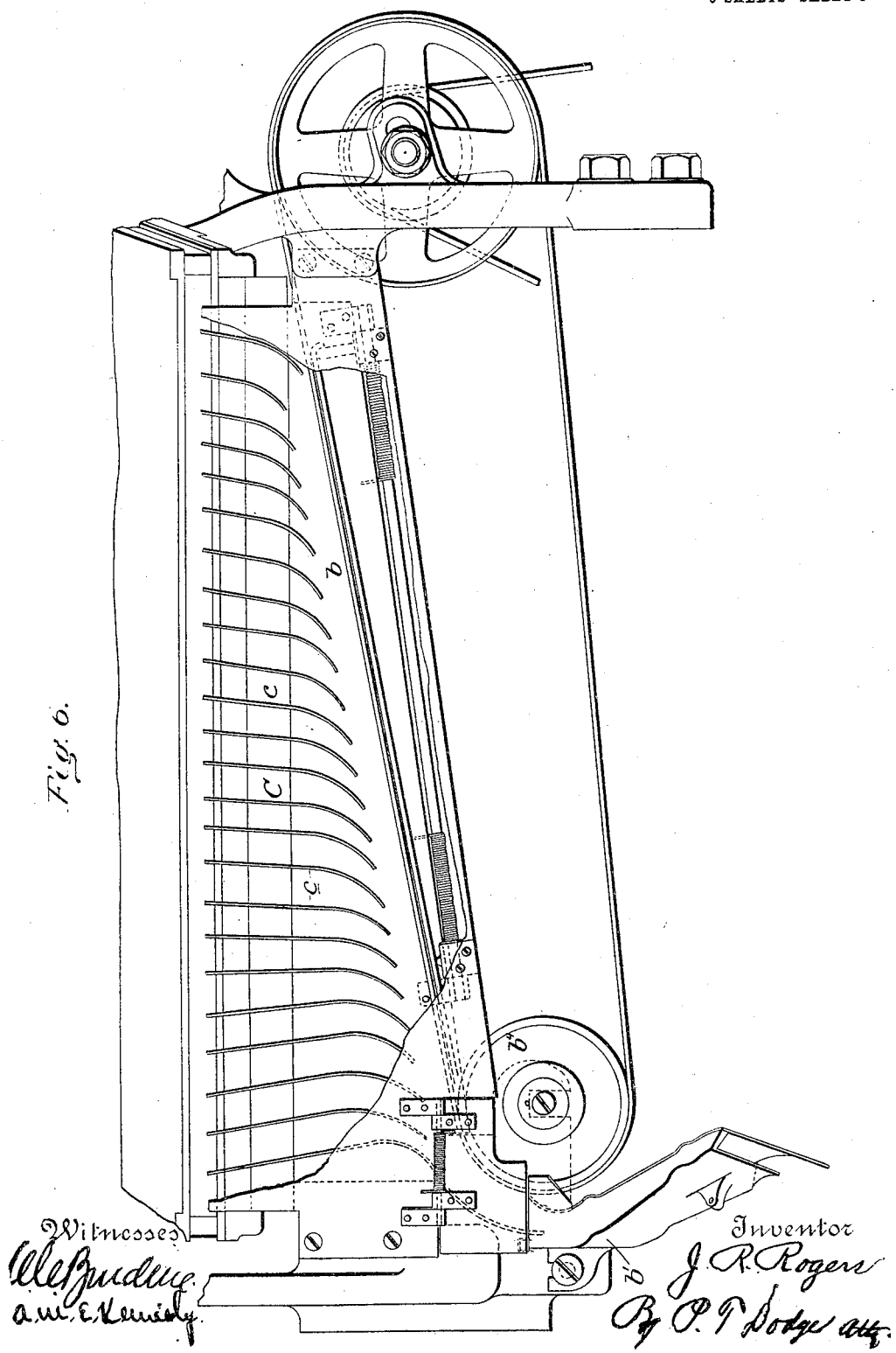

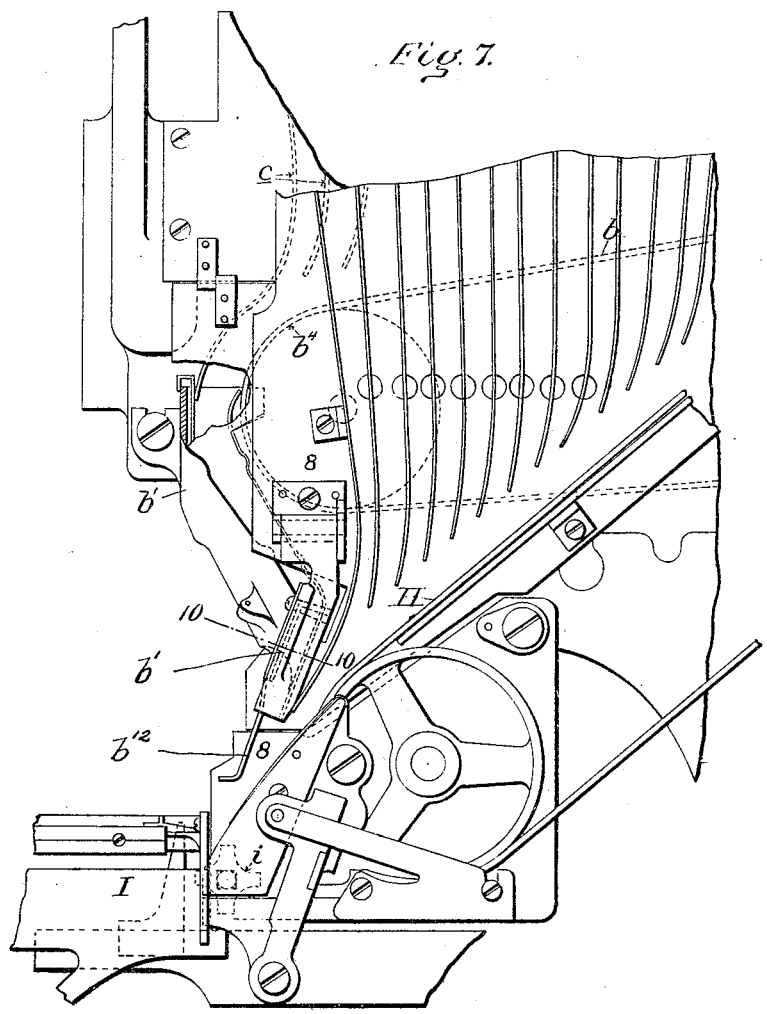

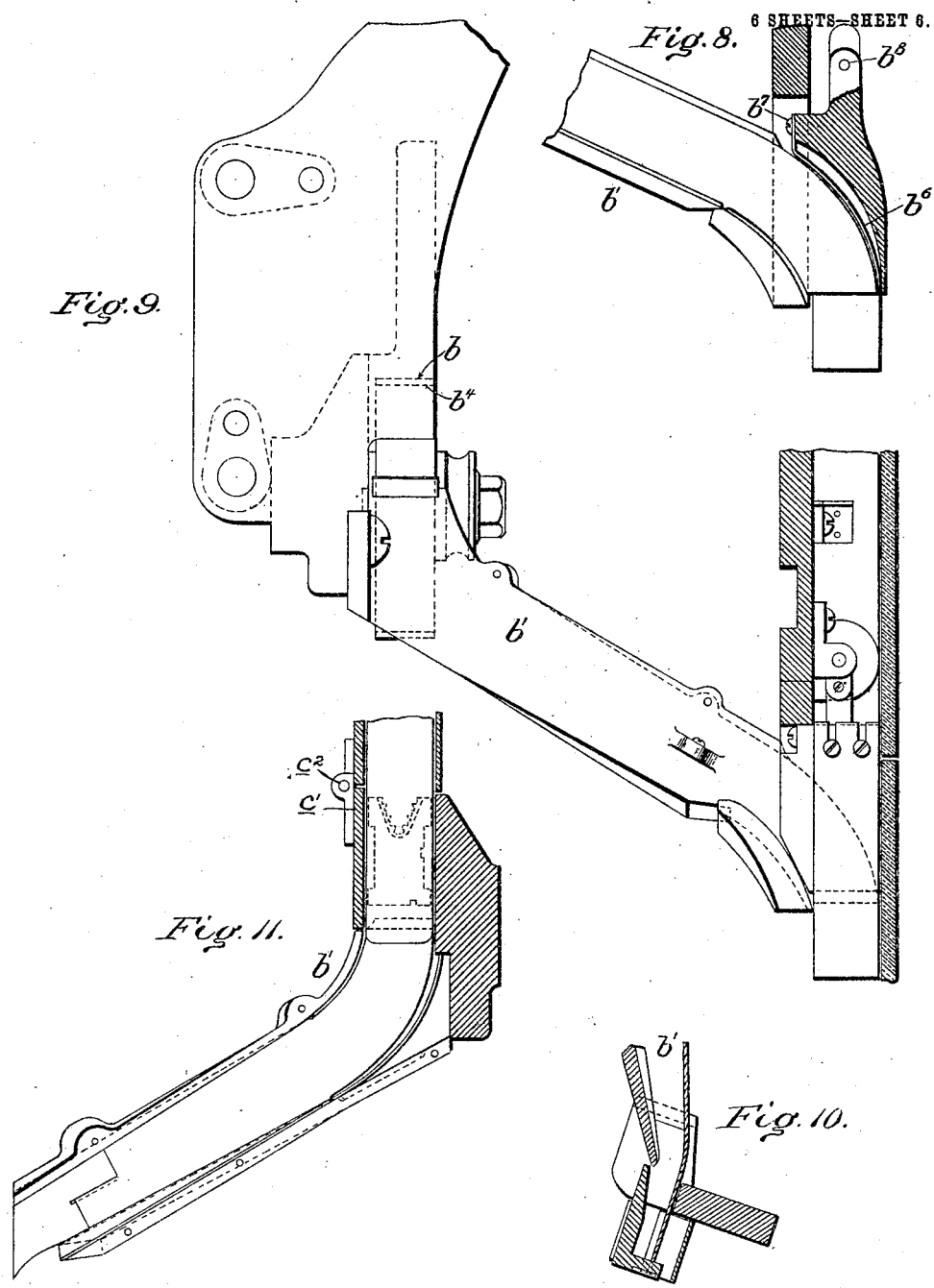

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINOTYPE-MACHINE.

No. 799,943. Specification of Letters Patent. Patented Sept. 19, 1905.

Application filed January 28, 1905. Serial No. 243,033.

*To all whom it may concern:*

Be it known that I, JOHN R. ROGERS, of Brooklyn, county of Kings, and State of New York, have invented a new and useful Improvement in Linotype-Machines, of which the following is a specification.

This invention relates to linotype-machines of the general organization represented in Letters Patent of the United States No. 640,033, granted to me on the 26th day of December, 1899. In the patented machine there are two matrix-magazines, one overlying the other. These magazines deliver their matrices by means of carrier-belts and guides to a common assembler, from which the composed line is transferred to the casting mechanism, as usual. After being used the composed line is lifted to the top of the machine, where the line is disintegrated and the individual matrices delivered to one or another of two distributers overlying the upper ends of the respective magazines. In the practical operation of the machines it is necessary to gain access to the upper ends of the magazines and to the distributers. To this end I mount the lower distributing mechanism on a pivoted or swinging support, so that it may be swung away from its operative position to expose the mouth of the lower magazine. I combine with the distributer-support a counterbalancing spring or springs or equivalent counterbalancing devices to relieve the operator of the labor of lifting the parts and to sustain them in an elevated position. I mount one of the carrier-screws of the upper magazine on hinged supports, so that it may be turned upward independently out of the way to expose the upper distributer-bar and the mouth of the upper magazine. The magazine-mouths are independently hinged or pivoted, so that they may be turned downward to give access to the distributer-bars and to the upper ends of the channels in the magazine proper. The two magazines are independently supported in and are independently removable from the frame of the machine, so that either one may be replaced at will by another containing matrices of a different face. The magazines are inserted and removed through the rear side of the main frame, as usual in linotype-machines. They rest at their lower or forward ends on bearings in the frame and at their rear ends on cross-bars $b^{20}$ and $b^{21}$, similar to those which have been used in commercial linotype-machines for many years past. The removal of the magazines is effected by drawing them rearward and tipping them downward over the rear supporting-bars.

Referring to the drawings, Figure 1 is a perspective view of the upper part of a linotype-machine containing my improvements looking toward the rear right-hand corner. Fig. 2 is an elevation looking from the left with certain parts broken away and shown in section. Fig. 3 is a diagram illustrating the position of the matrix carrier-belt. Fig. 4 is a cross-section on the line 4 4 of Fig. 1 with the lower distributer thrown backward away from its operative position. Fig. 5 is a section similar to Fig. 2 through one end of the distributing devices in order to show more particularly the latches for locking the parts in operative position. Fig. 6 is a transverse vertical section on the line 6 6, Fig. 2, showing the assembler-belt of the lower magazine and its connections. Fig. 7 is a front elevation of the assembling devices and the parts for delivering matrices thereto. Fig. 8 is a cross-section on the line 8 8, Fig. 7, through the mouth of the chute for delivering matrices from the lower magazine to the assembler. Fig. 9 is a side elevation of the chute and attendant parts looking from the left. Fig. 10 is a section on the line 10 10, Fig. 7. Fig. 11 is a view of the chute shown in Fig. 9 looking from the opposite side, with the side plate removed.

Referring to the drawings, A represents the rigid frame of the machine.

B B' are the two inclined magazines intended to contain matrices. These magazines are provided at their lower ends with escapements controlled in their action by a finger-key mechanism and serving to control the discharge of the matrices from the various magazine-channels. The matrices delivered as usual from the upper magazine are received upon the usual inclined belt H and delivered thereby into the assembler I, (see Fig. 3,) while the matrices delivered from the lower magazine are received on the belt $b$ and delivered thence through a guide or tube $b'$ into the assembler I.

All the foregoing parts, with the exceptions hereinafter noted, may be of the same or essentially the same construction as those represented in the original patent or of the construction adopted in the commercial machines now in use, my invention having no special relation thereto.

The magazines are provided at the upper ends with the usual throats or guides $b^2$ and $b^3$, forming upward continuations of the magazines and terminating directly under the distributers to receive the falling matrices. These throats, commonly known in the trade as "channel-entrances," are hinged, as usual, to the respective magazines, so that they may be turned downward and backward to give access to the magazine-channels and the adjacent parts, and they are divided, as usual, by a series of vertical partition-plates, between which the matrices are guided into the grooves or channels of the magazines. Over the respective throats or channel-entrances are mounted the usual distributer-bars X and X', provided in their lower edges with longitudinal teeth, permuted in arrangement, and adapted to receive and suspend the matrices as they are moved along the bars until they arrive over the appropriate channels in the magazines. Adjacent to each of the distributer-bars there are three parallel screws $x$, $x'$, and $x^2$, which serve to engage the edges of the pendent matrices and carry them along the distributer-bars. The individual matrices will be presented to the distributer-bars and their screws at one end by mechanism such as shown in Patent No. 640,033 or by any equivalent mechanism which will present the matrices properly to the respective bars. The upper distributer-bar X is bolted rigidly to the main frame, and its feed-screws $x'$ and $x^2$ are also mounted in the main frame; but the outer screws $x$ are carried by arms $x^3$, depending from the horizontal shaft $x^4$, fixed on the main frame, around which they may be turned in an upward direction, so as to carry the screw $x$ rearward and out of the way in order to expose the distributer-bar and the throat of the upper magazine. The lower distributer-bar X' instead of being secured rigidly to the main frame is attached to a horizontal bar or beam $x^5$, secured at its extremities to the lower ends of two supporting bars or arms $x^6$, connected at their upper ends to the main frame by horizontal pivots $x^7$. The screws $x'$ and $x^2$ of the lower distributer-bar are secured in bearings fixed to bar $x^5$. The adjacent screw $x$ is carried by swinging arms $x^{20}$, arranged to turn around a supporting-rod $x^{21}$, secured to the outer side of the bar or beam $x^5$, so that the screw $x$ of the lower distributer may be turned upward and backward independently in order to expose the lower edge of the distributer-bar $x'$ and the adjacent parts. It will be seen that the lower distributer-bar and its three feed-screws are all supported by the arms $x^6$, so that they may all be swung backward and upward from their operative positions, as shown in Fig. 4, thus exposing the upper end of the lower magazine, so that access may be had to its interior and also permitting the upper magazine to be removed and replaced by another at will without interference on the part of the lower distributer. To one end of the bar $x^5$ and the adjacent arm $x^6$ I also secure the tube or conductor Z, corresponding to the tube Z in my Patent No. 640,033, for guiding the individual matrices from the upper level downward to the lower distributer-screws and feed devices. The matrix-lift $x^{16}$ and its operating devices, corresponding to the parts bearing like letters in Patent No. 640,033, are also carried by the swinging bar and arm. In short it will be seen that the pivoted arms $x^6$ and the connected bars constitute a swinging frame to which all the parts of the lower distributing mechanism are attached, so that they may be instantly carried rearward and upward out of the way without disturbing their relations to each other.

In order to counterbalance the weight of the swinging distributer and to sustain the same in its elevated position, so that the attendant may have both hands free for other purposes, I propose to combine with the swinging arms springs, weights, or other equivalent counterbalancing devices. I prefer to employ the arrangement shown in the drawings, in which each arm $x^6$ is connected by a pivoted link $x^{10}$ to a lever $x^{11}$, pivoted to the main frame and acted upon by a tension-spring $x^{12}$, extending downward to the main frame and connected to the latter by an adjusting-screw $x^{13}$. When the parts are in operative position, the several pivots stand in line, or practically so, so that the spring exerts little or no lifting effect on the distributer. When, however, the distributer is carried rearward, the pivots are thrown out of line and the spring acts with increasing effect, so that it finally serves to overcome the entire weight of the distributer and to sustain the same in the position shown in Fig. 4. When the parts are in operative position, the frame-bar $x^5$ bears against stop-surfaces on the main frame, and the parts are held in position by locking devices $x^{14}$.

The essence of the invention resides in the employment of hinged or pivoted connections between the lower distributer, as a whole, and the main frame, so that the distributer may be turned out of its operative position at will, and it is manifest that the details of construction may be modified at the will of the constructing mechanic, provided there is no essential departure from the mode of action herein described.

The swinging arms $x^3$, which carry the upper one of the rear or outer distributer-screws, are locked down to their operative position by a latch $x^{22}$, as shown in Fig. 5, and the arms $x^{20}$ of the outer screw of the lower distributer are locked in like manner.

In my original patent the matrices were delivered from the lower magazine directly to the horizontal belt, by which they were carried to the upright chute leading to the assembler. In order to increase the speed of delivery and prevent danger of transposing the matrices, I now adopt the construction shown in Figs. 6 to 10, inclusive. The carrier-belt $b$ instead of having its upper carrier-surface arranged in a horizontal position parallel with the mouth of the lower magazine is now given a substantial inclination downward toward the delivery end to the left, as shown in Fig. 6, and between this belt and the mouth of the lower magazine B, I mount a guide chamber or channel C, divided by upright partitions $c$, the lower ends of which are curved to the left, as shown, and terminated half an inch, more or less, above the surface of the belt. By this arrangement the descending matrices are prevented from overturning and are guided downward with a forward inclination on the belt. Approaching the belt with considerable speed and in a direction in which they are to be carried the matrices will lie down instantly thereon and partake of the full speed of the belt, so that there is do danger of a matrix released at the left reaching the line in advance of a matrix previously released at the right. Matrices are released by expert operators with great rapidity, sometimes several in one second, so that the avoidance of transpositions is a matter of great importance and great difficulty.

In order to permit access to the guide-chamber or throat C, a portion of its rear wall $c'$ is hinged in its upper edge at $c^2$, Fig. 11, so that it may be turned backward, as indicated in dotted lines.

The delivery end of the belt $b$ is carried by an upright pulley $b^4$. The center of this pulley is located in a vertical plane well within the left side of the magazine, so that the carrying-surface of the belt begins to descend rapidly before the matrices reach their limit of forward movement, or, in other words, before they reach the delivery-chute $b'$.

The partitions $c$ at the extreme left of the magazine are carried downward and deflected to the left, as shown. These partitions permit the matrices to begin their downward movement before their movement to the left is completed, so that although traveling rapidly they will be deflected downward and directed into the chute $b'$ without any appreciable loss of speed.

As shown in Figs. 6, 7, 8, and 9, the chute $b'$ is carried downward and forward toward the plane of the assembler I, and, as shown in Fig. 7, it is deflected first toward the right as it passes below the level of the supporting-wheel $b^4$ and is thereafter deflected to the left, so that its delivery end will direct the matrices downward in the proper course to the assembler I and the adjacent star-wheel $i$, by which the matrices are crowded into the assembler, as usual. The deflection of the delivery end of the chute $b'$ to the left is of decided advantage, since it terminates immediately above the assembling devices and over the path through which the matrices descend from the upper magazine. This deflection to the left causes the matrices from the lower magazine to pursue practically the same path as those from the upper magazine into the assembler. It is therefore possible to assemble from the lower magazine with practically the same speed as from the upper. The chute terminates at some distance above the assembler and directly in front of the main carrier-belt H, so as to direct the matrices downward into the assembler in the path pursued by the matrices from the main belt and the upper magazine. Near its delivery end the chute approaching from the rear must be given a sharp downward turn, as shown in Fig. 8. In order to prevent the matrices from wearing or being mutilated by contact with the front wall of the chute as they turn at this point, a thin sheet-metal spring $b^6$ is arranged on the front upper side of the chute, as shown in Fig. 8, the spring being fastened in its upper end by a screw $b^7$. The front portion of the chute where the spring is located is made separate from the remaining portion and mounted at $b^8$ on a horizontal pivot, so that it may be turned forward and upward to give access to the mouth of the chute in the event of the matrices being lodged or clogged therein. To this hinged end of the chute $b'$ I secure, as shown in Fig. 7, the flat downwardly-extending spring $b^{12}$, its lower free end overlying the path through which the matrices descend. This finger is of essentially the same form and answers the same purpose as the spring heretofore employed in the commercial linotype-machine, in which it was secured permanently in position. Being attached, as herein shown, to the hinged end of the chute, it may be turned upward with the chute in order to permit free access to the adjacent parts.

When the lower distributer is mounted to swing bodily upward, as described, it is necessary to provide special driving connections therefor, so that they may not be disarranged or disconnected when the magazine is moved. These are clearly represented in Fig. 1, in which G represents a belt-driven pulley mounten on one of the upper distributer-screws and acting through a friction-clutch $g$, as usual. To the tubular shaft of this clutch I attach a pulley $g'$, from which a belt $g^2$ is extended upward to a pulley $g^3$. From this pulley a second belt $g^4$ is extended downward to a driving-pulley $g^5$ on the end of one of the lower distributer-screws, these screws being geared together, as usual. The pulley $g^3$ is mounted on or concentric with one of the pivots $x^7$, around which the distributer-support swings.

It will be observed that under this arrangement the swinging of the lower distributer is without effect on its driving-belt $g^4$.

Having thus described my improvement, what I claim is—

1. In a linotype-machine and in combination with a main frame and a magazine mounted therein, a distributing mechanism hinged as a whole to swing to and from the magazine.

2. In a linotype-machine, the frame, the stationary magazine, in combination with swinging supports, $x^6$, and the distributing mechanism carried thereby.

3. In a linotype-machine, the main frame and the magazine therein, in combination with a distributer hinged to swing bodily upward, and spring connections to counterbalance the same.

4. The main frame, the hinged distributer, the springs, and intermediate connecting devices, substantially as shown.

5. In combination with the magazine and main frame, the hinged arms $x^6$, and the distributer bar, screws, chute, and lift, all carried thereby.

6. In combination with the hinged distributer, spring connections tending to raise the same, and a locking device to hold it down in place.

7. In combination with a swinging support therefor, the distributer-screws $x'$ $x^2$, and distributer-bar fixed thereon, and the outer distributer-screw, having its supports hinged to the swinging support, substantially as shown, whereby said outer screw may be moved independently of the other parts, or the entire distributer moved without changing the relation of the screws.

8. In a linotype-machine, the main frame, the two stationary magazines, the upper distributer-bar, X, and its screws $x'$, $x^2$, fixed in position, the adjacent screw $x$, connected to the main frame by hinged supports, swinging supports $x^6$, the lower distributer-bar, and the adjacent screws $x'$, $x^2$, fixed to said swinging support, and the adjacent outer screw, $x$, having hinged connections with said support.

9. In a linotype-machine, the main frame, the two inclined magazines mounted therein and independently removable therefrom, and the distributer for the lower magazine hinged to swing out of the path of the upper magazine, when the latter is to be removed.

10. In a linotype-machine and in combination with matrix-assembling devices, the magazine B, terminating in rear of the assembling devices, the inclined chute $b'$ arranged to conduct the matrices forward to the assembling devices, the belt $b$ inclined downward toward the chute to deliver matrices thereto, and the chamber C, having partitions $c$, to guide the matrices from the magazine to the belt.

11. In a linotype-machine and in combination with the magazine B, the inclined assembler-belt $b$, the intermediate chamber with partitions, $c$, the chute $b'$, and the belt-carrying pulley $b^4$, located in a vertical plane passing through the magazine, whereby the advancing matrices are permitted to begin their descent before reaching the limits of the magazine.

12. In a linotype-machine, the combination with the magazine B, the carrier-belt $b$ inclined downward in the direction of delivery, its sustaining-pulley $b^4$, and the intermediate chamber C, with partitions $c$ of successively-increased length, the last partition being carried downward around the belt-sustaining pulley, substantially as described and shown.

13. In a linotype-machine, the magazine B, and conveyer-belt, $b$, in combination with the chute $b'$, having a downward and forward inclination and a delivery end curved sharply downward to deliver the matrices to the assembling devices.

14. In a linotype-machine, in combination with the magazine, B, the carrier-belt $b$, and the matrix receiving and guiding chute, $b'$, having a downward and forward inclination and a deflection first to the right and then to the left.

15. In a linotype-machine, the combination of the assembler, the upper magazine and its belt, H, arranged to direct the matrices downward into the assembler, the lower magazine, its carrier-belt, $b$, and the chute $b'$, having its upper end in position to receive the matrices from the belt $b$, and its lower end terminated with an inclination to the left to direct the matrices to the same path as those from the belt H.

16. In combination with the magazine, B, and the carrier-belt, $b$, the intermediate chamber C, provided with partitions $c$, and with a movable side, $c'$, affording access to the belt and the partitions.

17. In a linotype-machine and in combination with the chute, $b'$, through which the matrices descend, the spring $b^6$, in the path of the matrices, to deflect and change their course.

18. In combination with the chute $b'$, the movable front portion at its lower end, mounted to turn on a pivot $b^8$.

19. In a linotype-machine, the matrix-conducting chute $b'$, having its delivery end provided with a hinged forward portion having a spring $b^6$ attached thereto.

20. In a typographic machine, a distributer mounted to turn about an axis, in combination with a driving-pulley concentric with said axis, and connections thence to the operative parts of the distributer, whereby the movement of the distributer is permitted without disturbance of the driving connections.

21. In a linotype-machine, the distributer bar and screws, the swinging frame wherein they are mounted, in combination with a pulley on one of said screws, a driving-pulley concentric with the axis of the frame, and connections between said pulleys.

22. In a linotype-machine, in combination with the assembling devices, the finger $b^{12}$ overlying the matrix-path and mounted to turn upward in the operative position around a supporting-pivot.

23. In a linotype-machine, the hinged chute-mouth $b'$, having the finger $b^{12}$ attached thereto.

In testimony whereof I hereunto set my hand, this 19th day of January, 1905, in the presence of two attesting witnesses.

JOHN R. ROGERS.

Witnesses:
D. S. KENNEDY,
JOHN PAULSEN.